US012735317B2

(12) United States Patent
Toda et al.

(10) Patent No.: US 12,735,317 B2

(45) Date of Patent: Sep. 15, 2026

(54) HYDRIDE ION CONDUCTOR

(71) Applicants: AGC Inc., Tokyo (JP); TOKYO INSTITUTE OF TECHNOLOGY, Tokyo (JP)

(72) Inventors: Yoshitake Toda, Tokyo (JP); Takeya Mezaki, Tokyo (JP); Kohta Yamada, Tokyo (JP); Naoki Matsui, Tokyo (JP); Guangzhong Jiang, Tokyo (JP); Ryoji Kanno, Tokyo (JP)

(73) Assignees: AGC INC., Tokyo (JP); Tokyo Institute of Technology, Tokyo (JP)

( * ) Notice: Subject to any disclaimer, the term of this patent is extended or adjusted under 35 U.S.C. 154(b) by 234 days.

(21) Appl. No.: 18/427,080

(22) Filed: Jan. 30, 2024

(65) Prior Publication Data

US 2024/0166512 A1 May 23, 2024

Related U.S. Application Data

(63) Continuation of application No. PCT/JP2022/028954, filed on Jul. 27, 2022.

(30) Foreign Application Priority Data

Aug. 6, 2021 (JP) ................................ 2021-130270

(51) Int. Cl.

*C01B 6/24* (2006.01)

*H01M 10/0562* (2010.01)

(52) U.S. Cl.

CPC ............ *C01B 6/24* (2013.01); *C01P 2002/50* (2013.01); *C01P 2002/72* (2013.01);

(Continued)

(58) Field of Classification Search

CPC ......... C01B 6/24; C01B 6/04; C01P 2002/50; C01P 2002/72; C01P 2002/77;

(Continued)

(56) References Cited

U.S. PATENT DOCUMENTS 5,062,946 A * 11/1991 Dufresne .............. C10G 45/64 208/115

5,246,688 A * 9/1993 Faust ...................... B01J 29/04 423/709

(Continued)

FOREIGN PATENT DOCUMENTS

CN 102530872 A 7/2012

JP 2005-067915 A 3/2005

(Continued)

OTHER PUBLICATIONS

Gingl et al.; Othorhombic Ba6Mg7H26: a new fluoride-related ternary alkaline earth hydride; Elsevier; Journal of Alloys and Compounds 253-254 (1997) 17-20. (Year: 1997).*

(Continued)

*Primary Examiner* — Christian Roldan

(74) *Attorney, Agent, or Firm* — Foley & Lardner LLP

(57) ABSTRACT

A hydride ion conductor represented by a general formula:

$$Ba_{2-x-m}A_xMg_{1-y-n}B_yH_{6-x-y-2m-2n} \quad (1),$$

wherein A and B are each selected from at least one or more of the group consisting of Li, Na, K, Rb, and Cs, and $0 \le x \le 1$, $0 \le y \le 1$, $0 \le m \le 0.2$, and $0 \le n \le 0.2$, excluding a case where $x=y=m=n=0$.

5 Claims, 7 Drawing Sheets

DIFFUSION BARRIERS OF $Ba_2MgH_6$ ($P\text{-}3m1$) (NEB)

H-CENTERED BONDS ARE DEPICTED

FOUR DIFFUSION PATHS $MgH_6$-$MgH_6$ HOPPING IN AB PLANE (i–iii): 0.41 eV $MgH_6$ OCTAHEDRAL H ROTATION IN AB PLANE (i–iv): 0.45 eV THREE-DIMENSIONAL (C-AXIS) DIFFUSION BARRIER IS 0.45 eV $MgH_6$-$MgH_6$ HOPPING IN C-AXIS DIRECTION (i–ii): 0.34 eV $MgH_6$ OCTAHEDRAL H ROTATION IN C-AXIS DIRECTION (i–v): 0.13 eV ONE-DIMENSIONAL (C-AXIS) DIFFUSION BARRIER IS 0.34 eV

(52) U.S. Cl.
CPC ...... *C01P 2002/77* (2013.01); *C01P 2002/88* (2013.01); *C01P 2006/40* (2013.01)

(58) Field of Classification Search
CPC ............ C01P 2002/88; C01P 2006/40; H01M 10/0562; H01B 1/06; Y02E 60/10
See application file for complete search history.

(56) References Cited

U.S. PATENT DOCUMENTS

| | | | | |
|---|---|---|---|---|
| 2013/0129600 A1* | 5/2013 | Tokoyoda | C01B 21/06 | 423/409 |
| 2014/0017576 A1* | 1/2014 | Kim | H01M 10/056 | 429/211 |

FOREIGN PATENT DOCUMENTS

| | | | |
|---|---|---|---|
| JP | 2011-204632 A | | 10/2011 |
| JP | 5540179 B2 | | 7/2014 |
| JP | 2017098067 A | * | 6/2017 |

OTHER PUBLICATIONS

European Extended Search Report issued in corresponding European Patent Application No. 22852919.4 dated Jun. 24, 2025.

Fukui et al., "Characteristic fast H-ion conduction in oxygen-substituted lanthanum hydride," Nature Communications, vol. 10, Article No. 2578, 2019, pp. 1-8.

Verbraeken et al., "High H-ionic conductivity in barium hydride", Nature Materials, vol. 14, 2015, pp. 95-100.

Norby, Truls, "Solid-state protonic conductors: principles, properties, progress and prospects," Solid State Ionics, vol. 125, 1999, pp. 1-11.

International Searching Authority, "International Search Report," issued in connection with International Patent Application No. PCT/JP2022/028954, dated Sep. 27, 2022.

International Searching Authority, "Written Opinion," issued in connection with International Patent Application No. PCT/JP2022/028954, dated Sep. 27, 2022.

* cited by examiner

FIG.1

DIFFUSION BARRIERS OF $Ba_2MgH_6$ ($P$-3$m$1) (NEB)

H-CENTERED BONDS ARE DEPICTED

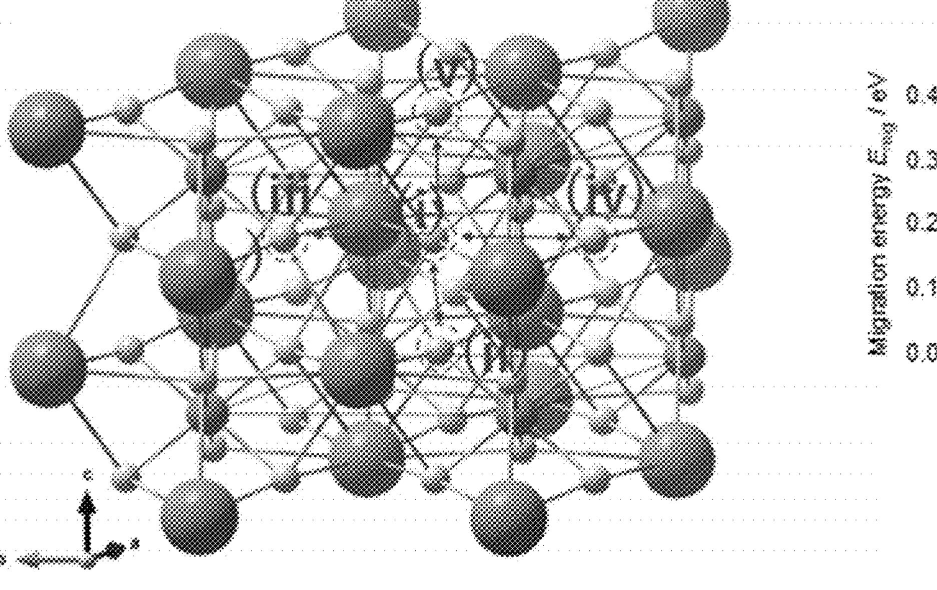

Migration energy $E_{mig}$ / eV 0.0 0.1 0.2 0.3 0.4

Reaction coordinate 0 1 2 3 4 5 6 i - ii
i - iii
i - iv
i - v

FOUR DIFFUSION PATHS $MgH_6$-$MgH_6$ HOPPING IN AB PLANE (i-iii): 0.41 eV $MgH_6$ OCTAHEDRAL H ROTATION IN AB PLANE (i-iv): 0.45 eV THREE-DIMENSIONAL (C-AXIS) DIFFUSION BARRIER IS 0.45 eV $MgH_6$-$MgH_6$ HOPPING IN C-AXIS DIRECTION (i-ii): 0.34 eV $MgH_6$ OCTAHEDRAL H ROTATION IN C-AXIS DIRECTION (i-v): 0.13 eV ONE-DIMENSIONAL (C-AXIS) DIFFUSION BARRIER IS 0.34 eV

HYDRIDE ION CONDUCTOR

CROSS-REFERENCE TO RELATED APPLICATIONS

This application is a continuation of International Application No. PCT/JP2022/028954, filed on Jul. 27, 2022 and designating the U.S., which claims priority to Japanese Patent Application No. 2021-130270, filed on Aug. 6, 2021. The contents of these applications are incorporated herein by reference in their entirety.

BACKGROUND OF THE INVENTION

1. Field of the Invention

The present disclosure relates to a hydride ion conductor.

2. Description of the Related Art

A hydride ion ($H^-$) composed of a hydrogen atom and two electrons is lighter than a lithium ion, has many characteristics, such as having an ionic radius similar to that of a fluoride ion ($F^-$), and is an electrochemically attractive charge carrier.

For example, new energy devices may be achieved when hydride ion conductors are used as ion conductors in place of conventional protons ($H^+$) and lithium ions ($Li^+$) in electrochemical devices such as fuel cells and secondary cells.

Some hydride ion conductors exhibiting high ion conductivity have been reported (Non-Patent Documents 1 and 2, for example).

RELATED-ART DOCUMENTS

Non-Patent Documents

Non-Patent Document 1: Keiga Fukui, et al., "Characteristic fast $H^-$ ion conduction in oxygen-substituted lanthanum hydride", nature communications, (2019) 10:2578

Non-Patent Document 2: Maarten C. Verbraeken, et al., "High $H^-$ ionic conductivity in barium hydride", nature materials, vol. 14, p.95-p.100, January, 2015

SUMMARY OF THE INVENTION

According to the present disclosure, provided is a hydride ion conductor represented by a general formula:

$$Ba_{2-x-m}A_xMg_{1-y-n}B_yH_{6-x-y-2m-2n} \quad (1),$$

wherein A and B are each selected from at least one or more of the group consisting of Li, Na, K, Rb, and Cs, and $0 \leq x \leq 1$, $0 \leq y \leq 1$, $0 \leq m \leq 0.2$, and $0 \leq n \leq 0.2$, excluding a case where $x=y=m=n=0$.

Further, according to the present disclosure, provided is a hydride ion conductor having an $(NH_4)SiF_6$-type structure.

Further, according to the present disclosure, provided is a hydride ion conductor satisfying:

(a) $X<1.6$; and (b) $0 \leq Y \leq -3X+3$, wherein X represents 1,000 times a reciprocal of a temperature T(K), and Y represents a common logarithm ($\log(\sigma)$) of conductivity (S/cm) of the hydride ion conductor.

BRIEF DESCRIPTION OF THE DRAWINGS

Other objects and further features of the present invention will be apparent from the following detailed description when read in conjunction with the accompanying drawings, in which:

FIG. 1 is a drawing schematically illustrating a crystal structure of a hydride ion conductor ($Ba_2MgH_6$) according to one embodiment of the present disclosure;

DESCRIPTION OF THE EMBODIMENTS

In order to apply hydride ion conductors to electrochemical devices, high hydride ion conductivity is required. In this respect, it is considered that conventional hydride ion conductors are still insufficient.

According to the present disclosure, a hydride ion conductor having higher ion conductivity can be provided.

In the following, one embodiment of the present disclosure will be described with reference to the drawings.

(Hydride Ion Conductor According to One Embodiment of the Present Disclosure)

One embodiment of the present disclosure provides a hydride ion conductor represented by a general formula:

$$Ba_{2-x-m}A_xMg_{1-y-n}B_yH_{6-x-y-2m-2n} \quad (1),$$

wherein A and B are each selected from at least one or more of the group consisting of Li, Na, K, Rb, and Cs, and $0 \leq x \leq 1$, $0 \leq y \leq 1$, $0 \leq m \leq 0.2$, and $0 \leq n \leq 0.2$, excluding a case where $x=y=m=n=0$.

Further, one embodiment of the present disclosure provides a hydride ion conductor having an $(NH_4)SiF_6$-type structure.

The hydride ion conductor according to one embodiment of the present disclosure is, for example, $Ba_2MgH_6$ or $Ba_{1.9}K_{0.1}MgH_{5.9}$. Each of these compounds has a crystal structure of an $(NH_4)SiF_6$-type structure.

FIG. 1 schematically illustrates the crystal structure of $Ba_2MgH_6$, which is one kind of hydride ion conductor according to one embodiment of the present disclosure.

In FIG. 1, the largest atom is a Ba atom, the next largest atom is a Mg atom, and the smallest atom is a hydrogen atom.

Further, the right side of FIG. 1 illustrates the migration energy along each diffusion path of hydrogen (H) atoms assumed in the crystal structure of $Ba_2MgH_6$.

In the crystal structure of $Ba_2MgH_6$, as diffusion paths of H atoms, the following four are conceivable:

(I) $MgH_6$—$MgH_6$ hopping in the ab plane (i-iii path);

(II) $MgH_6$ octahedral H rotation in the ab plane (i-iv path);

(III) $MgH_6$—$MgH_6$ hopping in the c-axis direction (i-ii path); and (IV) $MgH_6$ octahedral H rotation in the c-axis direction (i-v path).

As illustrated on the right side in FIG. 1, nudged elastic band calculations obtained by using VASP indicated that the migration energy of H atoms was the smallest in the case (IV). However, in any of the cases, it was found that the migration energy of H atoms in the $Ba_2MgH_6$ crystal lattice was approximately 0.45 eV at the maximum, which was a sufficiently small value.

As described, in the crystal structure of $Ba_2MgH_6$, the migration barriers of H atoms are sufficiently small, and thus it is expected that $Ba_2MgH_6$ exhibits significantly high hydride ion conductivity.

Figure 2:
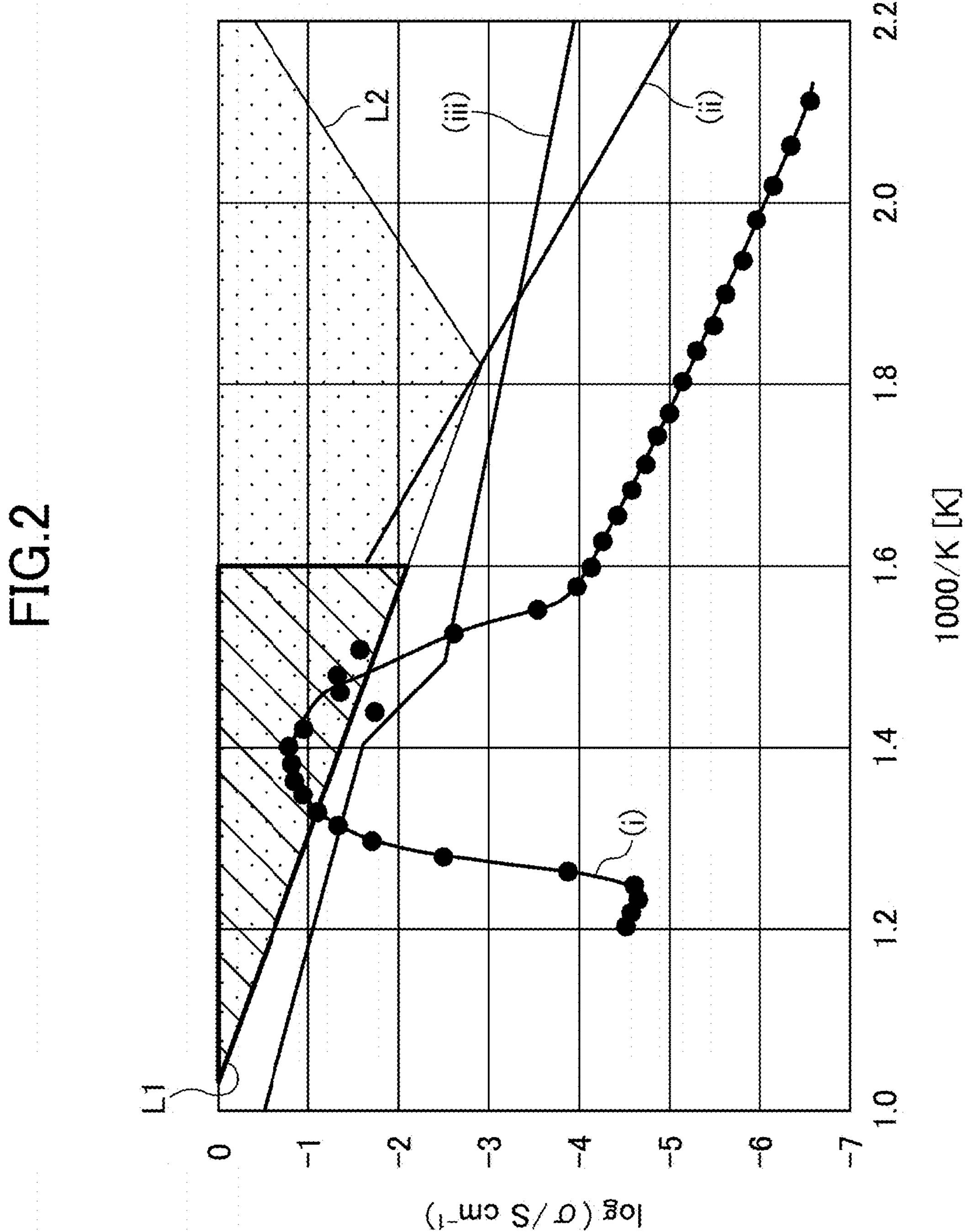
FIG. 2 is a graph illustrating, together with the temperature dependence of conventional hydride ion conductor, the temperature dependence of the conductivity of the hydride ion conductor ($Ba_2MgH_6$) according to one embodiment of the present disclosure.

FIG. 2 illustrates the temperature dependence of the conductivity of the hydride ion conductor according to one embodiment of the present disclosure.

In FIG. 2, the horizontal axis represents 1000 times the reciprocal (1/T) of a temperature T, and the vertical axis represents conductivity σ (logarithmic representation). In FIG. 2, (i) indicates conductivity characteristics of $Ba_2MgH_6$ according to one embodiment of the present disclosure. Further, (ii) and (iii) indicate conductivity characteristics of a hydride ion conductor (LaHO) described in Non-Patent Document 1 and conductivity characteristics of a hydride ion conductor ($BaH_2$) described in Non-Patent Document 2, respectively.

From FIG. 2, it can be seen that $Ba_2MgH_6$ has good ion conductivity that is superior to those of the conventional LaHO hydride ion conductor and $BaH_2$ hydride ion conductor in a temperature range of approximately 350° C. to approximately 500° C.

Note that from the above-described considerations, it is expected that $Ba_2MgH_6$ conduction is due to hydride ion conduction.

In FIG. 2, a sparsely-dotted region is a region called "Norby gap", and it has been reported that proton ($H^+$) conduction is difficult to occur in this region (for details, see Solid State Ionics 125 1-11 (1999)).

A boundary Li on the left side of this Norby gap region is represented by the following formula:

$$Y=-3X+3 \quad (2)$$

In this formula, X represents 1000 times the reciprocal of a temperature T(K), and Y represents a common logarithm (log(o)) of conductivity (S/cm).

The hydride ion conductor according to one embodiment of the present disclosure has a characteristic in that the conductivity belongs to a region indicated by diagonal lines in FIG. 2.

Accordingly, one embodiment of the present disclosure provides a hydride ion conductor satisfying:

(a) $X<1.6$; and (b) $0\geq Y\geq -3X+3$, wherein X represents 1,000 times the reciprocal of a temperature T(K), and Y represents a common logarithm (log(σ)) of conductivity (S/cm) of the hydride ion conductor.

In particular, X preferably satisfies $1.3<X<1.5$.

The hydride ion conductor according to one embodiment of the present disclosure may have conductivity of $5\times10^{-2}$ S/cm or more in the Norby gap region. The hydride ion conductor according to one embodiment of the present disclosure preferably has conductivity of $1\times10^{-1}$ S/cm or more in the Norby gap region.

As described, the hydride ion conductor according to one embodiment of the present disclosure exhibits significantly high ion conductivity in a predetermined temperature range, as compared to the conventional hydride ion conductors.

Therefore, it is expected that an electrochemical device having good characteristics can be achieved when the hydride ion conductor according to one embodiment of the present disclosure is used.

(Method of Manufacturing a Hydride Ion Conductor According to One Embodiment of the Present Disclosure)

In the following, a method of manufacturing a hydride ion conductor according to one embodiment of the present disclosure will be briefly described with reference to FIG. 3.

Figure 3:
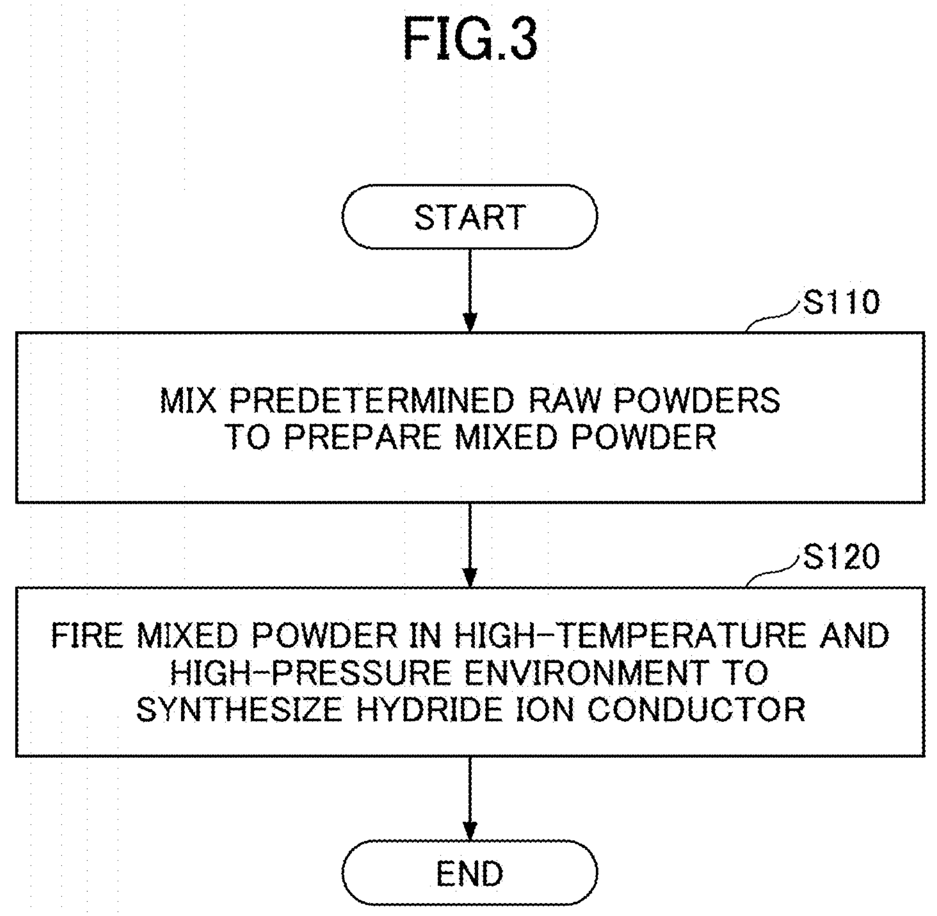
FIG. 3 is a drawing schematically illustrating the flow of a method of manufacturing a hydride ion conductor according to one embodiment of the present disclosure.

FIG. 3 schematically illustrates the flow of the method of manufacturing a hydride ion conductor according to one embodiment of the present disclosure.

As illustrated in FIG. 3, the method of manufacturing a hydride ion conductor according to one embodiment of the present disclosure includes:

(i) a step of mixing predetermined raw powders to prepare a mixed powder (step S110); and (ii) a step of firing the mixed powder in a high-temperature and high-pressure environment to synthesize a hydride ion conductor (step S120).

Note that the hydride ion conductor according to one embodiment of the present disclosure is highly reactive, and thus the steps are performed in an argon environment.

Each of the steps will be described below.

(Step S110)

First, powders as raw materials are prepared.

The raw materials may include hydrides of metals, that is, $BaH_2$, AH, $MgH_2$, and BH (where A and B are each selected from at least one or more of the group costing of Li, Na, K, Rb, and Cs, and B may be the same as or different from A), For example, if the hydride ion conductor is $Ba_2MgH_6$, $BaH_2$ and $MgH_2$ may be used as the raw materials.

The raw materials may be sufficiently mixed by using a ball mill or the like.

(Step S120)

Next, a mixed powder is fired in a high-temperature and high-pressure environment to synthesize the hydride ion conductor.

A cubic-anvil high-pressure apparatus may be used for the synthesis.

When this apparatus is used, a cubic cell called a pyrophyllite cell is used, and the interior of the pyrophyllite cell is filled with the mixed powder. Then, an ultrahigh hydrostatic pressure is generated by the cubic-anvil high-pressure apparatus, and as a result, the six faces of the pyrophyllite cell disposed inside the cubic-anvil high-pressure apparatus can be isotropically pressurized.

The pressure applied to the pyrophyllite cell is, for example, in the range of 2 GPa to 6 GPa.

The firing temperature is, for example, in the range of 700° C. to 1000° C.

With the above-described steps, the hydride ion conductor having high ion conductivity as described above can be manufactured.

Note that the above-described manufacturing method is merely an example, and the hydride ion conductor according to one embodiment of the present disclosure may be manufactured by a different manufacturing method.

EXAMPLES

Next, examples of the present disclosure will be described.

Hydride ion conductor samples were produced by the following method. In addition, characteristics of the produced samples were evaluated.

Example 1

(Production of Samples)

The samples for evaluation were produced by the following method.

(Production of Sample A)

In an Ar atmosphere, 1.827 g of $BaH_2$ powder (manufactured by Sigma Aldrich) and 0.173 g of $MgH_2$ powder (manufactured by Sigma Aldrich) were weighed to prepare a mixed powder.

The average particle size of the $BaH_2$ powder was 10 μm, and the average particle size of the $MgH_2$ powder was 10 μm. Further, $BaH_2$:$MgH_2$ was 2:1 (molar ratio). That is, the target composition of the mixed powder was $Ba_2MgH_6$, which was the stoichiometric ratio.

The obtained mixed powder was loaded into a planetary ball mill, and then pulverized and mixed at room temperature. The rotation speed was 200 rpm, and the treatment time was 12 hours.

In this manner, a sample A was produced.

(Production of Sample B)

A sample B was prepared by the same method as the sample A.

However, in the sample B, 1.794 g of $BaH_2$ powder (manufactured by Sigma Aldrich), 0.178 g of $MgH_2$ powder (manufactured by Sigma Aldrich), and 0.027 g of KH powder (manufactured by Sigma Aldrich) were used as raw materials.

The average particle size of the KH powder was 10 μm. Further, $BaH_2$:$MgH_2$:KH was 1.9:1:0.1 (molar ratio). That is, the target composition of the mixed powder was $Ba_{1.9}K_{0.1}MgH_{5.9}$.

(Evaluation)

(X-Ray Diffraction Analysis)

A benchtop X-ray diffraction analyzer (MiniFlex600 manufactured by Rigaku Corporation) was used to evaluate the crystal phases of the sample A and the sample B.

(Alternating Current Impedance Measurement)

The sample A and the sample B were molded to produce molded bodies each having a diameter of approximately 6 mm and a thickness of approximately 2 mm. Gold electrodes were brought into contact with the bottom surfaces of both the molded bodies, and alternating current impedance measurement was performed by using an atmosphere-controlled measurement cell.

As a measurement device, VSP-300 (manufactured by Bio-Logic) was used. A measurement frequency was in the range of 1 Hz to 7 MHz, and an applied alternating voltage was in the range of 50 mV to 500 mV. The measurement was performed in a hydrogen atmosphere.

Figure 4:
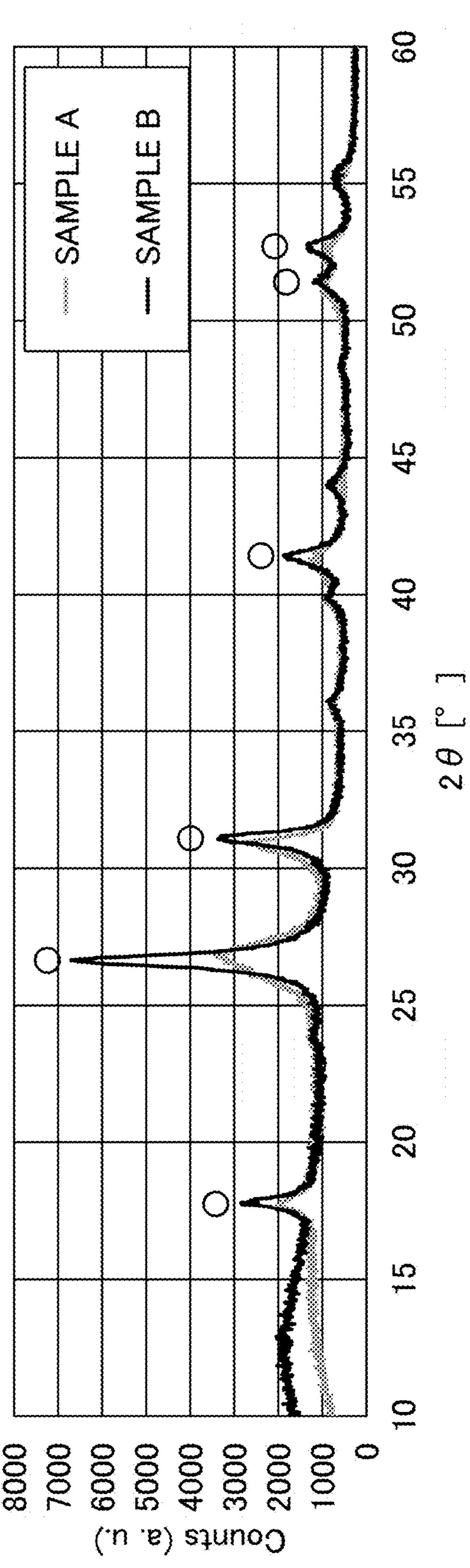
FIG. 4 is a drawing illustrating the X-ray diffraction analysis results of hydride ion conductors (a sample A and a sample B) according to one embodiment of the present disclosure.

FIG. 4 illustrates the X-ray diffraction analysis results of the sample A and the sample B. In FIG. 4, peaks indicated by "o" correspond to peaks of the $Ba_2MgH_6$ crystal phase.

From FIG. 4, it was confirmed that the main phase was the $Ba_2MgH_6$ phase in each of the samples. In addition, it was confirmed that the width of the diffraction peak of the sample B is narrower than that of the sample A, and the crystallinity of the sample B is higher than that of the sample A.

Figure 5:
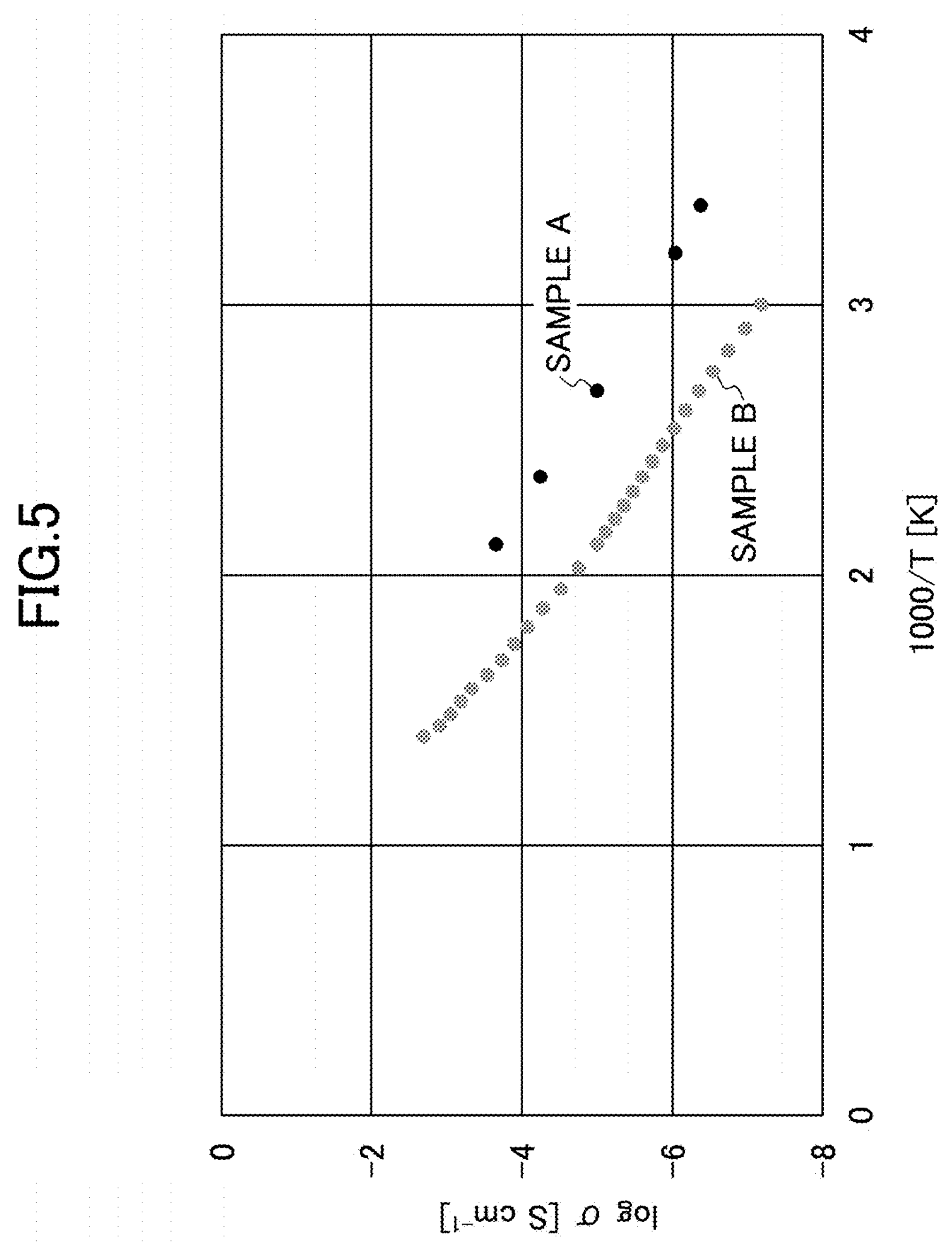
FIG. 5 is a graph illustrating the measurement results of conductivity of the hydride ion conductors (the sample A and the sample B) according to one embodiment of the present disclosure.

FIG. 5 illustrates the results of conductivity obtained by performing the alternating current impedance measurement at each temperature.

From FIG. 5, it was found that, in each of the samples, the logarithm of conductivity changed linearly with respect to the reciprocal of temperature and the ion conduction mechanism followed the Arrhenius equation.

In the sample B, $Ba^{2+}$ ions were replaced with $K^+$ ions, and hydrogen deficiency was actively introduced. The sample A exhibited higher conductivity than that of the sample B in a temperature range from room temperature to 200° C. In addition, FIG. 4 indicates that the crystallinity of the sample A is lower than the crystallinity of the sample B. Accordingly, it is conceivable that in the sample A, Schottky defects of one Ba atom and two H atoms or one Mg atom and two H atoms were generated, that is, an ion conductor of the formula (1), free of A and B, where $x=y=0$, and $m\neq0$ or $n\neq0$ was obtained.

Note that the sample A exhibited high conductivity in the temperature range from room temperature to 200° C. Thus, the measurement was not performed at a temperature higher than 200° C.

Example 2

(Production of Sample)

A sample (hereinafter referred to as a "sample C") for evaluation was produced by the following method.

$BaH_2$ powder and $MgH_2$ powder were weighed such that the molar ratio of $BaH_2$:$MgH_2$ was 2:1.1, and then pulverized and mixed in a mortar for twenty minutes to prepare a mixed powder.

The reason why the content of Mg in the mixed powder was slightly excessive was to avoid compositional deviation of a finally obtained sample due to reaction with a boron nitride tube used later.

Next, the obtained mixed powder was compacted and enclosed in the boron nitride tube. Further, this tube was placed in the pyrophyllite cell, and the cubic-anvil high-pressure apparatus was used to fire the mixed powder.

The mixed powder was fired for 30 minutes under firing conditions of 5 GPa and 900° C.

In this manner, the sample C was obtained.

Evaluation (X-Ray Diffraction Analysis)

X-ray diffraction analysis of the sample C was performed by using beamline BL19B2 of a synchrotron radiation facility "SPring-8" (wavelength: 0.5 Å.)

The measurement was performed on the sample enclosed in a quartz glass capillary having an inner diameter of 0.1 mm in an argon atmosphere in a temperature range from room temperature to 500° C. Specifically, after the X-ray diffraction analysis was performed at room temperature, the sample was heated to a predetermined temperature, and the same measurement was performed on the sample. This was repeated up to 500° C.

(Alternating Current Impedance Measurement)

The sample C was polished in an argon atmosphere to obtain a cylindrical sample having a diameter of approximately 4 mm and a thickness of 1 mm.

A gold electrode was brought into contact with the bottom surface of the obtained sample, and alternating current impedance measurement was performed by using the atmosphere-controlled measurement cell.

As a measurement device, VSP-300 (manufactured by Bio-Logic) was used. A measurement frequency was in the range of 1 Hz to 7 MHz, and an applied alternating voltage was in the range of 50 mV to 500 mV. The measurement was performed in a hydrogen atmosphere. The conductivity was calculated from the measurement results (cole-cole-plot).

Figure 6:
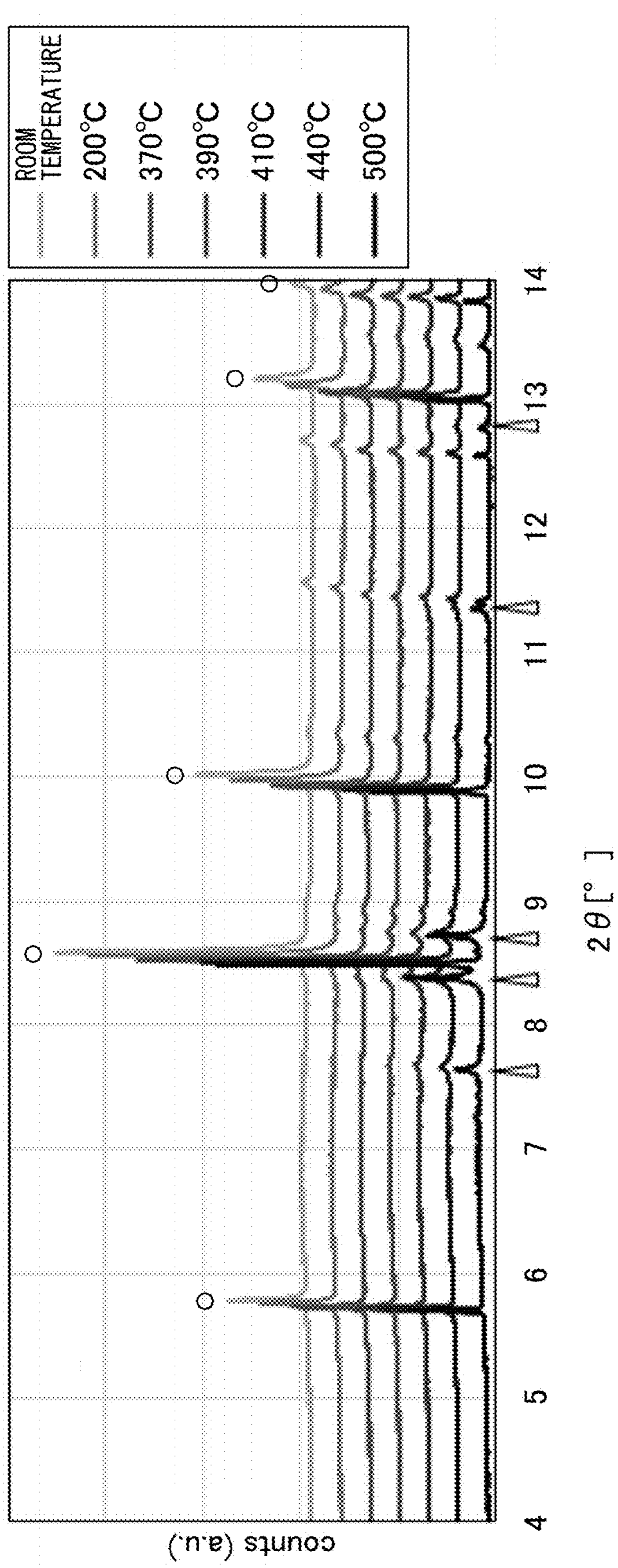
FIG. 6 is a drawing collectively illustrating the X-ray diffraction analysis results of a hydride ion conductor (a sample C) according to one embodiment of the present disclosure at respective temperatures.

FIG. 6 collectively illustrates the X-ray diffraction analysis results of the sample C at respective temperatures. In FIG. 6, peaks indicated by "o" correspond to peaks of the $Ba_2MgH_6$ crystal phase.

From FIG. 6, it was found that the main phase in the sample C was the $Ba_2MgH_6$ phase at each of the measurement temperatures.

Note that as the temperature of the sample C increased, peaks, indicated by A, of a phase other than the main phase appeared. These peaks correspond to peaks of the $BaH_2$ phase.

In addition, the series of results indicate that the positions at which the peaks of the main phase appear tends to be shifted to a lower angle side as the temperature increases. This tendency corresponds to the behavior of the crystal lattice that expands as the temperature increases.

Figure 7:
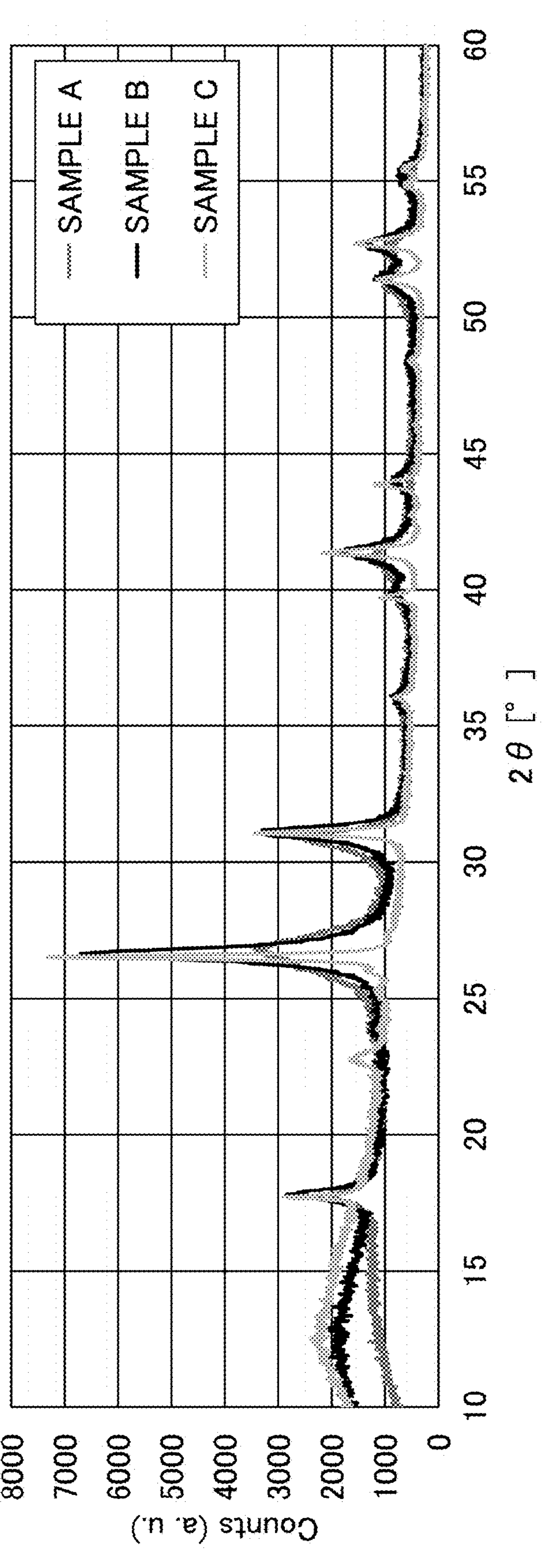
FIG. 7 is a drawing collectively illustrating the X-ray diffraction analysis results of the hydride ion conductors (the sample A to the sample C) according to the one embodiment of the present disclosure.

FIG. 7 illustrates the above-described X-ray diffraction analysis results (FIG. 4) again. However, in addition to the measurement results of the sample A and the sample B, FIG. 7 also illustrates the measurement results of the sample C at room temperature, obtained by using the benchtop X-ray diffraction analyzer (MiniFlex600 manufactured by Rigaku Corporation).

From the comparison between the sample A (or the sample B) and the sample C, it was found that the peaks of $Ba_2MgH_6$, which is the main phase, were sharper and a half-width was smaller in the sample C. This indicates that $Mg_2MgH_6$ with higher crystallinity is formed in the sample C.

The relationship between temperature and ion conductivity obtained in the sample C is depicted in (i) of FIG. 2 described above.

From FIG. 2, it was found that in the sample C, the conductivity in a high temperature range was in the Norby gap region and significantly high conductivity was obtained. In particular, high conductivity exceeding $10^{-1}$ S/cm was obtained at around 450° C.

To the extent understood by the applicant, hydride ion conductors having such high conductivity at around 450° C. have not been recognized to date.

Note that, from FIG. 2, it was found that the conductivity of the sample C was significantly increased from a temperature range that exceeds approximately 350° C.

From the results of the synchrotron radiation XRD at the various temperatures indicated in FIG. 6, precipitation of the $BaH_2$ phase (A) can be confirmed at 370° C. or more. Because the $Ba_2MgH_6$ phase is not decomposed despite the precipitation of $BaH_2$, it is expected that Ba deficiency and H deficiency are introduced into $Ba_2MgH_6$. As a result of Rietveld analysis of the synchrotron radiation XRD results, it was confirmed that Ba deficiency corresponding to the mass fraction of the precipitated $BaH_2$ was generated in the $Ba_2MgH_6$ phase at 370° C. or more. It is conceivable that in the sample C, H deficiency was introduced by removal of $BaH_2$ as a result of an increase in temperature, rather than by introduction of a different element. That is, $Ba_{2-x-m}A_x Mg_{1-y-n}B_yH_{6-x-y-2m-2n}$ (x=y=n=0) was produced.

From the above considerations, it is conceivable that the conductivity of the sample C jumped at approximately 350° C. and high ion

What is claimed is:

1. A hydride ion conductor represented by a general formula:

$$Ba_{2-x-m}A_xMg_{1-y-n}B_yH_{6-x-y-2m-2n} \quad (1),$$

wherein A and B are each selected from at least one or more of the group consisting of Li, Na, K, Rb, and Cs, and $0 \le x \le 1$, $0 \le y \le 1$, $0 \le m \le 0.2$, and $0 \le n \le 0.2$, excluding a case where x=y=m=n=0.

2. The hydride ion conductor according to claim 1, wherein the B is different from the A.

3. The hydride ion conductor according to claim 1 having an $(NH_4)$ $SiF_6$-type structure.

4. The hydride ion conductor according to claim 1 satisfying: (a) X<1.6; and (b) $0 \ge Y \ge -3X+3$, wherein X represents 1,000 times a reciprocal of a temperature T (K), and Y represents a common logarithm (log (σ)) of conductivity (S/cm) of the hydride ion conductor.

5. The hydride ion conductor according to claim 1, wherein the general formula is $Ba_{1.9}K_{0.1}MgH_{5.9}$.

* * * * *